April 16, 1968     I. V. K. HOTT ET AL     3,377,981

LEVEL INDICATOR

Filed March 18, 1964     2 Sheets-Sheet 1

INVENTORS
ION V. K. HOTT
DAVID M. GOLDZWIG
BY
Dybvig & Dybvig
THEIR ATTORNEYS

April 16, 1968    I. V. K. HOTT ET AL    3,377,981

LEVEL INDICATOR

Filed March 18, 1964    2 Sheets-Sheet 2

INVENTORS
ION V. K. HOTT
DAVID M. GOLDZWIG

BY

*Dybvig & Dybvig*

THEIR ATTORNEYS

United States Patent Office 3,377,981
Patented Apr. 16, 1968

3,377,981
LEVEL INDICATOR
Ion V. K. Hott and David M. Goldzwig, Dayton, Ohio, assignors to The Joyce-Cridland Company, Dayton, Ohio, a corporation of Ohio
Filed Mar. 18, 1964, Ser. No. 352,908
9 Claims. (Cl. 116—110)

This invention relates to a level indicator and more particularly to level indicators for indicating potentially dangerous oil levels in vehicle lift mechanisms. As will be apparent from the following description, the invention is not necessarily so limited.

An object of this invention is to provide an improved level indicating device.

Another object of this invention is to provide an improved level indicating device signalling low oil level conditions in semi-hydraulic or hydraulic lift installations.

A still further object of this invention is the provision of an automatically actuated siren operative to indicate a low fluid level in an air pressurized reservoir.

Other objects and advantages reside in the construction of parts, the combination thereof, the method of manufacture and the mode of operation, as will become more apparent from the following description.

Referring to the drawings.

Figures 1, 2, 3, 4:
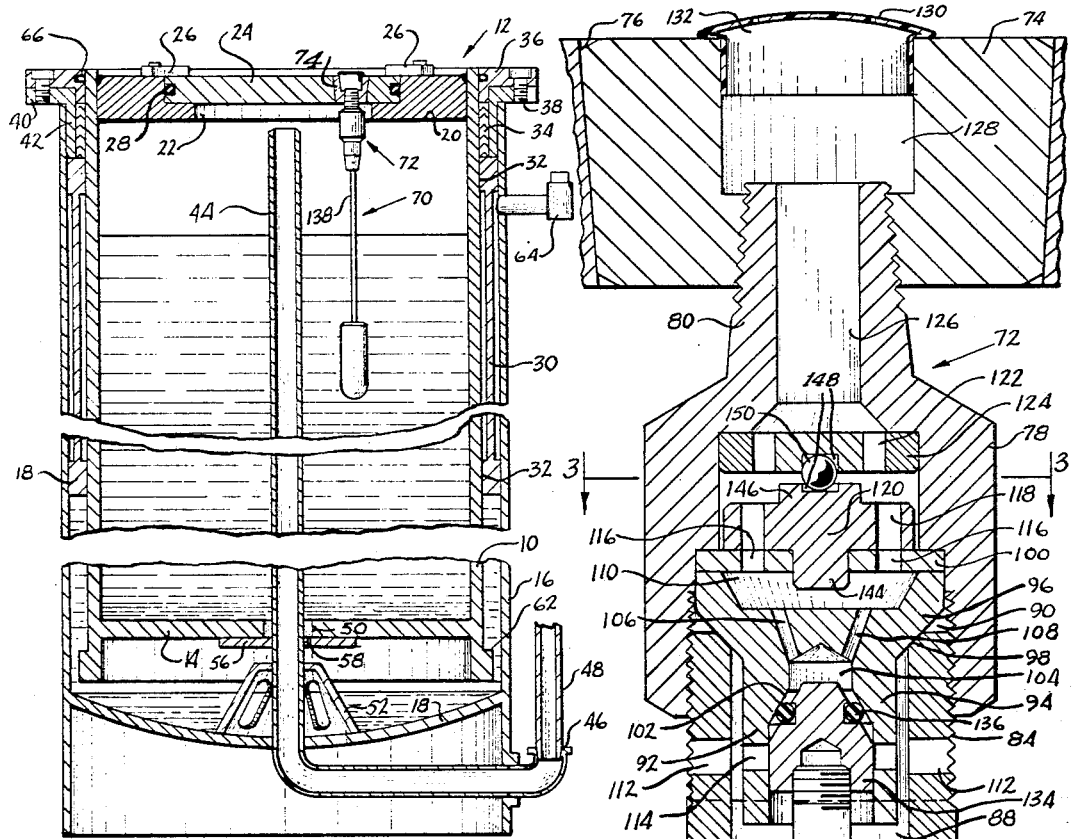
FIGURE 1 is a cross-sectional view, with portions broken away, illustrating a jacking unit of a semi-hydraulic lift provided with an indicating device made in accordance with this invention.
FIGURE 2 is an enlarged cross-sectional view of a portion of the indicating device shown in FIGURE 1.
FIGURE 3 is a cross-sectional view taken along line 3—3 of FIGURE 2 and illustrating a siren rotor.
FIGURE 4 is a cross-sectional view of the siren rotor taken along line 4—4 of FIGURE 3.

Referring to FIGURE 1, the invention is shown incorporated in a vehicle lift jacking unit comprising a piston 10 having a cover plate 12 and a base plate 14 mounted for vertical movement within a cylinder 16 having a base 18. The cylinder 16 normally would be in a pit in the ground with its upper end slightly above ground level and a vehicle engaging superstructure (not shown) normally would be attached to the cover plate 12 of the piston 10.

The coverplate 12 includes a cover mounting ring 20 welded interiorly of the piston 10. The ring 20 is apertured at 22 to receive a cover seal plate 24 clamped to the ring 20 as by clamp elements 26. To insure a complete closure, an O-ring seal 28 may be located between the periphery of the seal plate 24 and the cover mounting ring 20.

The upper end of the cylinder 16 is open so that the piston may raise up and down with respect thereto. As typical of semi-hydraulic lifts, the piston 10 is a hydraulic reservoir. As will be described below, the raising and lowering of the piston 10 is accomplished by air pressure acting upon the hydraulic medium, herein referred to as oil, in piston 10. Atttached to the interior of the cylinder 16 is a bearing member 30 having bearing surfaces 32 guiding the movement of the piston 10. Oil between the walls of the piston 10 and the cylinder 16 is maintained therein by packing members 34 sandwiched between the top of the bearing member 30 and a packing gland ring 36 attached as by bolts 38 to the annular flange 40 of a bolt ring 42 which in turn is attached to the cylinder 16 in any suitable fashion.

In operation, air under pressure is supplied to the top of the piston 10 internally thereof through an air tube 44 projecting longitudinally therethrough, which communicates with an air inlet port 46 connected to any suitable air supply line 48 externally of the cylinder 16. The air tube 44 passes centrally through the cylinder base 18 and an aperture 50 in the piston base plate 14. It is supported in an upright position by a generally conical support member 52 secured to the top of the cylinder base 18.

The rate with which the piston 10 raises and lowers in the cylinder 16 is controlled by oil flow through the aperture 50 in the piston base plate 14. Metering structures of various types have been designed accurately to control the rate of oil flow. Illustrated herein is a metering plate 56 having a small aperture 58 restricting the rate of oil flow. The rise of the piston 10 may be limited by an annular stop flange 62 which is adapted to engage the lowermost surface of the bearing member 30. After the piston 10 is fully extended, a valve (not shown) in the air supply line 48 is closed. Accordingly, a high air pressure is maintained within the piston 10 and it remains elevated. When the lift is to be lowered, the valve in the supply line 48 is opened and the air within the piston 10 exhausted to atmosphere.

Oil may be introduced into the jacking unit upon removal of a fill plug 74 threaded in a fill port 76. When filling the jacking unit, oil passes through the piston 10 into the cylinder 16 and upwardly around the bearing 30. Any air trapped in the cylinder above the oil passes out a bleeder valve 64.

Also shown in FIGURE 1 is a wiper ring 66 which cleans the exterior surface of the piston 10 as it lowers into the cylinder 16. Generally speaking, all of the elements described thus far are conventional in semi-hydraulic lifts. As desired, the basic lift structure described above may be modified in any conventional fashion.

As already noted, the rate of piston travel when raising and lowering is limited by the rate of oil flow through the metering plate 56. If, because of leakage or accident, the oil level within the piston 10 should fall so low that the oil within the piston is exhausted therefrom before the piston is fully extended, air under pressure will pass through the metering plate 56. Air under pressure, of course, can pass through the metering plate 56 at an undesirable high rate, causing the piston 10 to raise and lower erratically. Further, the air being compressible will not provide a stable support for the piston 10 in its fully extended position. This can result in potential danger to both person and property.

In accordance with this invention, the user of the lift installation is forewarned of low level oil conditions in a jacking unit in advance of the extreme low oil conditions which result in the erratic operation described above. To this end, an indicator device, designated 70 in FIGURE 1, including a vertically oriented housing structure 72, is screw threaded into an aperture in the fill plug 74. The indicator device 70 is shown in detail in FIGURE 2 through 6.

The housing 72 includes a generally cylindrical upper half 78 having a reduced screw threaded portion 80 threaded into the fill plug 74 and a generally cylindrical lower housing half 82 connected to the upper housing half 78 by cooperating screw threads, designated 84. A cylindrical chamber 88 bored centrally of the lower housing half 82 communicates with a similar chamber 90 within the upper housing half 78. Located within the enclosure formed by the chambers 88 and 90 is a central housing or body member 92 having a lower cylindrical body portion 94 and a flared upper conical body portion 96. A beveled surface 98 at the top of the lower housing half 82 abuts against the exterior conical surface of the upper portion 96 of the body member 92 such that, as the upper and lower housing halves 78 and 82 are screw threaded together, the central body member 92 is tightly wedged within the chambers 88 and 90 with its upper surface engaging and supporting the bottom surface of a siren plate 100 located at the extreme upper end of the chamber 90. The purpose of the siren plate 100 will be described in greater detail below.

Longitudinally of the central body member 92 is a generally cylindrical bore 102 having a conical valve seat surface interiorly of the member 92. Communicating with the bore 102 within the member 92 is a cylindrical chamber 104. A divergent pair of small air passageways 106 and 108 communicate between the chamber 104 and a chamber 110 formed between the bottom surface of the siren plate 100 and a recessed top surface of the body member 92. Air under pressure from within the piston 10 may pass through opposed apertures 112 in the lower housing half 82 and aligned apertures 114 in the central body member 92, which apertures are transverse to the bore 102. Air can then pass through the bore 102, the chamber 104, the passageways 106 and 108 to the chamber 110. From thence, air under pressure may pass through spaced passageways 116 in the siren plate 100, passageways 118 in a siren rotor 120, passageways 122 in a siren thrust plate 124, and to atmosphere through a passageway 126 centrally located of the reduced portion 80 of the upper housing half 78 and a chamber or bore 128 communicating therewith in the fill plug 74 and, finally, through apertures or passageways 130 in a plug cap 132. Thus, it is seen that the two housing halves 78 and 82 along with the central housing or body member 92 constitute an air conduit for the discharge of air from the piston 10 to atmosphere.

Normally, the passage of compressed air from within the piston 10 to atmosphere through the air conduit described above its prevented by a valve element 134 having a conical upper surface recessed to receive an O-ring seal 136 which seats against the conical, valve seat surface of the bore 102. The valve element 134 is mounted on a vertical valve stem 138 which projects through a longitudinal passageway 140 extending centrally through the lower housing half 82. A float 142 is connected to the base of the valve stem 138. The float may be made of magnesium and of the type described in United States Patent No. 2,763,128, issued Sept. 18, 1956, to Ion V. K. Hott. Assuming the piston 10 is fully lowered within the cylinder 16, the position shown in FIGURE 1, and assuming the level of oil within the piston 10 is sufficiently high, the float 142 will be fully submersed. Since it will tend to float, it forces the valve stem 138 and, accordingly, the valve element 134 upwardly such that the O-ring 136 seats against the conical surface of the bore 102.

In operation, when air is introduced into the piston 10, air under pressure passes through the apertures 112 in the lower housing half 82, and into the passageway formed in the chamber 88 between the lower housing half 82 and the body member 92. The air is then directed upwardly against the bottom surface of the valve element 134 in the bore 102. Since the top surface of element 134 is exposed to atmospheric pressure, the O-ring 136 remains in seating engagement with the valve seat surface of the bore 102. Thus, as the piston 10 rises under continued application of air under pressure and the float 142 rises above the oil within the piston 10, the O-ring 136 remains seated. Note to this end that the lower portion of the valve element 134 is cylindrical and there is a mating cylindrical bore within the central body member 92, receiving the valve element 134. The apertures 114 are directed to the cylindrical bore within the central body member 92. However, these apertures are blocked by the exterior cylindrical surface of the valve element 134.

The valve element 134 is so designed that when the air within the piston 10 is exhausted to atmosphere to lower the piston 10, the weight of the lift superstructure and of the piston 10 is sufficient to maintain a pressure adequate to in turn maintain the sealing relationship between the O-ring 136 and the valve seat surface of the bore 102. The specific design of the valve element 134 will, of course, depend upon the weight of the valve stem 138 and the float 142 and other factors, such as the viscosity of the oil. The critical dimension in the indicator design illustrated herein is the base of the valve element 134. An indicator device having a valve base diameter of 5/16 inch has been successfully used in a lift having a superstructure weighing approximately five hundred fifty pounds. The effective or cross-sectional area of the top of the valve element 134 exposed to atmosphere was 13/64 inch.

Figure 5:
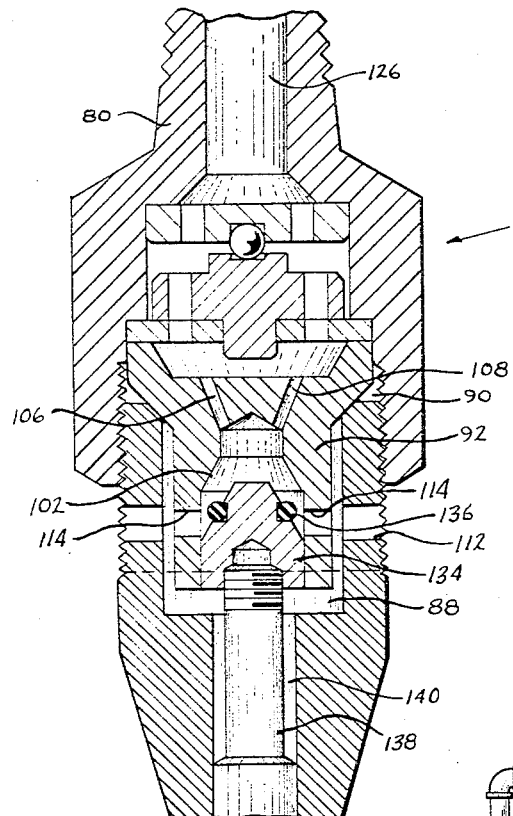
FIGURE 5 is a cross-sectional view similar to FIGURE 2 of a portion of the indicating device disclosing parts thereof in a different operating position.
Figure 6:
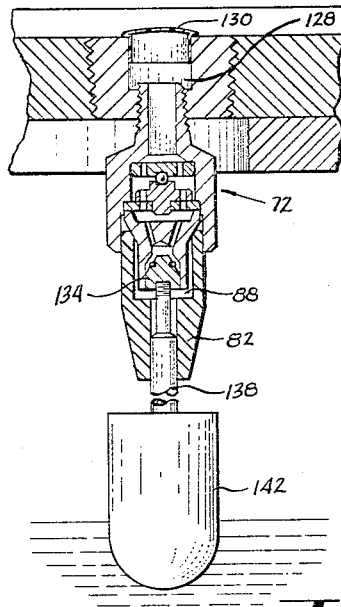
FIGURE 6 is a view similar to FIGURE 2 but with the parts as illustrated in FIGURE 5 and showing the relationship between a float assembly used with the indicating device and the level of liquid within the structure of FIGURE 1.

If the oil level falls to a predetermined low level when the piston 10 is lowered within the cylinder 16 such that the valve element 134 is no longer biased upwardly by the float 142, the O-ring 136, as shown in FIGURES 5 and 6, will no longer seat against the valve seat surface of the bore 102. Upon introduction of compressed air into the piston 10 through the tube 44, therefore, air under pressure passes through the aligned apertures 112 and 114 over the top of the lowered valve element 134 and subsequently through the various chambers and passageways described above. In the drawings, the passageways 106 and 108 in the central body member 92 are shown enlarged. In practice, these passageways may be approximately 1/16 inch in diameter, or smaller, and adequately restrict the flow of air therethrough that the lift piston 10 will still rise even when the valve element 134 has lowered. To prevent the valve element 134, along with the stem 138 and the float 142, from falling into the piston as it rises, the longitudinal passageway 140 in the lower housing half 82 is of a smaller diameter than the diameter of the lower cylindrical portion of the valve element 134. Accordingly, the valve element 134 lowers to rest upon the bottom surface of the chamber 88.

As illustrated in FIGURE 3, the passageways 118 in the siren rotor 120 are oblique to the longitudinal axis of the housing 72. The rotor 120 has a lower cylindrical hub portion 144 projecting downwardly through an aperture centrally located in the siren plate 100. The fit between the lower hub portion 144 and the central aperture within the siren plate 100 is sufficiently loose to permit the rotor 120 to rotate. The rotor 120 is also provided with an upwardly projecting hub portion 146. Central confronting recesses 148 in the upper hub portion 146 and the lower surface of the siren thrust plate 124 cage a ball element or bearing 150. A small clearance provided by the confronting recesses 148 permits the rotor 120 to rise slightly when air under pressure, which passes through the passageways 116 in the siren plate 100, flows upwardly into the oblique passageways 118 causing the rotor 120 to rise against the ball bearing 150 and, at the same time, causing the rotor 120 to rotate about the longitudinal axis of the hub portions 144 and 146. As the rotor 120 rotates at high speeds upon the application of air under pressure thereto, the well-known siren effect will take place. The siren comprised of the siren plate 100 and the rotor 120 will continue to operate so long as air under pressure passes therethrough.

From the foregoing, it may be seen that a device has been provided in which air under pressure exhausted from the inside of the piston 10 to atmosphere causes operation of a siren. Because of the restricted passageways 106 and 108, the exhausting of air to atmosphere does not substantially interfere with the normal operation of the lift. Even after the piston is fully extended and the supply of air under pressure to the piston 10 shut off, the piston will remain generally extended. It may creep downwardly somewhat, but not at an excessive speed. When the level of oil within the piston 10 is sufficient, while the piston 10 is fully lowered in the cylinder 16, the valve comprised of the O-ring 136 seated against the valve seat surface of the bore 102 prevents the passage of air to atmosphere through the device 70. The lift accordingly operates as usual.

Figure 7:
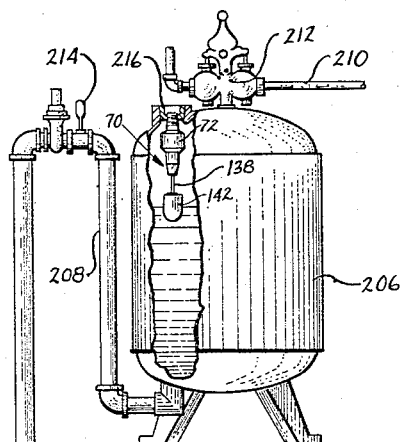
FIGURE 7 is a side elevational view, with portions broken away and in cross-section, of a full hydraulic lift installation employing an indicating device made in accordance with this invention.
Figure 7:
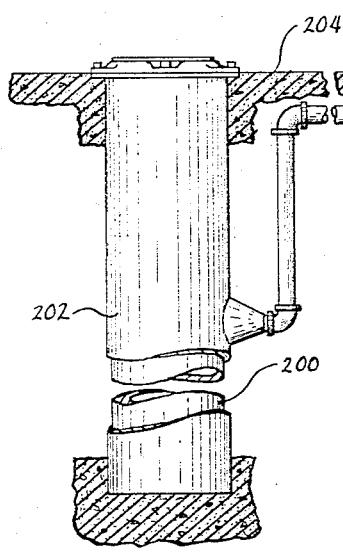

The detailed description above has been in connection with an indicator device 70 employed in a semi-hydraulic lift. FIGURE 7 illustrates the manner in which the same signal device 70 could be used in a full-hydraulic lift. A full-hydraulic lift, as shown in FIGURE 7, again includes a piston, designated 200, a cylinder 202 and the usual bearing and packing members (not shown) located within a pit in the floor, designated 204. In this case, there is no oil communication between the piston 200 and the cylinder 202. Oil is directed to the cylinder 202 from an oil reservoir 206 through a suitable conduit 208. When oil is forced into the cylinder 202, the piston 200 is forced to rise. Oil within the reservoir 206 is forced into the cylinder 202 by means of air under pressure from a suitable source, such as a compressor (not shown), passing through an air conduit 210 and an air valve generally designated 212, into the top of the reservoir 206. As apparent, upon introduction of air under pressure into the top of the reservoir 206, the oil therein will flow downwardly through the conduit 208 and, subsequently, to the cylinder 202. A hydraulic valve 214 is located in the conduit 208. In operation, it is intended that the hydraulic valve 214 be opened and air under pressure directed into the reservoir 206 by opening of the valve 212. After the piston 200 has extended upwardly to the desired height, the hydraulic valve 214 is first closed and the air valve 212 then closed. The extended piston 200, therefore, solidly rests upon a level of oil within the cylinder 202. To lower the piston 200, of course, the valve 214 is opened and the valve 212 adjusted to exhaust the air within the reservoir 206 to atmosphere. Thereafter, oil flows back from the cylinder 202 into the reservoir 206.

If the level of oil within the reservoir 206 should get so low that air would enter the conduit 208 past the hydraulic valve 214 while the piston 200 is rising, erratic operation of the lift mechanism similar to that described above with relation to a semi-hydraulic lift would result. To warn the user of the lift of FIGURE 7 that such a condition is existing or is about to exist, an indicating device 70 which may be identical in structure and operation to that described above is mounted in the top of the reservoir 206. In this case, the housing 72 is threadedly engaged within a fill plug 216. The device 70 further includes a float 142 and a valve stem 138, which may be identical to the elements previously described. The operation of the mechanism of FIGURE 7 is believed apparent. Of course, the valve element 134 (not shown in FIGURE 7) within the housing 72 will not lower at all unless there is a predetermined low level of oil within the reservoir 206 when the piston 200 is in its lowermost position.

Although the presently preferred embodiment of the device has been described, it will be understood that within the purview of this invention various changes may be made in the form, details, proportion and arrangement of parts, the combination thereof and mode of operation, which generally stated consist in a device capable of carrying out the objects set forth, as disclosed and defined in the appended claims.

Having thus described our invention, we claim:

1. An air operated indicator device including a housing, an air conduit within said housing, a signal device including an apertured siren plate mounted in said conduit, a siren thrust plate mounted in said conduit, an apertured siren rotor mounted for rotation relative to said siren plate between said siren plate and said thrust plate, at least some of the apertures within said rotor confronting at least some of the apertures in said siren plate, the apertures within said rotor being oblique to said siren plate whereby said rotor rotates when a sufficient air flow passes therethrough, and a thrust bearing mounted between said siren rotor and said thrust plate, a surface of said siren rotor resting upon said siren plate when air sufficient to cause said rotor to rotate is not passing through the apertures in said siren rotor, but rising above said siren plate against said thrust bearing when the air flow through the rotor apertures is sufficient to cause said rotor to rotate.

2. The structure of claim 1 wherein confronting recesses are located in said siren rotor and said siren thrust plate, and wherein said thrust bearing comprises a ball element caged within said confronting recesses.

3. For use in an assembly wherein oil in a reservoir is discharged therefrom by introduction of air under pressure above the level of oil, indicator means signalling a predetermined low level of oil in the reservoir comprising: an air conduit within said reservoir, said air conduit having one end connected to a wall portion of said reservoir and open to atmosphere and another end open to the area inside said reservoir above the level of oil therein; a valve seat in said air conduit, a valve element slidable in said air conduit from a position in which said valve element engages said valve seat to close said air conduit to a position separated from said valve seat to permit air to pass from said area above the level of oil in said reservoir to atmosphere through said air conduit; a float within said reservoir adapted to float at least partially in the oil therein; means connecting said float to said valve element whereby said valve element is maintained engaged with said valve seat so long as the oil level within said reservoir exceeds said predetermined low level and moving said valve element relative to said valve seat in response to changes in position of said float resulting from changes in the height of oil within said reservoir; and an air operated signal device within said air conduit between said valve seat and said end of said conduit open to atmosphere.

4. The structure of claim 3 wherein said reservoir comprises the piston of a semi-hydraulic vehicle lift.

5. The structure of claim 3 wherein said air operated signal device includes an apertured siren plate mounted in said air conduit, a siren thrust plate mounted in said air conduit, an apertured siren rotor mounted in said air conduit for rotation relative to said siren plate between said siren plate and said thrust plate, at least some of the apertures within said rotor confronting at least some of the apertures in said siren plate, the apertures within said rotor being oblique to said siren plate whereby said rotor rotates when sufficient air passes therethrough, and a thrust bearing mounted between said siren rotor and said thrust plate.

6. The structure of claim 3 wherein said air conduit projects vertically downwardly in said reservoir, said air conduit including transverse passageways providing an air path between said reservoir and said valve seat; and wherein said valve element is movable vertically upwardly to engage said valve seat and has surface portions adapted to block said transverse passageways when said valve element engages said valve seat.

7. The structure of claim 6 wherein said valve element has a base exposed to air within said reservoir of sufficient area that air pressure within said reservoir maintains said valve element seated while oil is discharged from said reservoir so long as the oil level within said reservoir exceeds said predetermined low level upon introduction of air under pressure into said reservoir.

8. The structure of claim 7 wherein said reservoir comprises the piston of a semi-hydraulic vehicle lift.

9. The structure of claim 8 wherein said air operated signal device includes an apertured siren plate mounted in said air conduit, a siren thrust plate mounted in said air conduit, an apertured siren rotor mounted in said air conduit for rotation relative to said siren plate between said siren plate and said thrust plate, at least some of the apertures within said rotor confronting at least some of the apertures in said siren plate, the apertures within said rotor being oblique to said siren plate whereby said rotor rotates when sufficient air passes therethrough, and a thrust bearing mounted between said siren rotor and said thrust plate.

References Cited

UNITED STATES PATENTS

| | | | |
|---|---|---|---|
| 77,809 | 5/1868 | Flinn | 73—307 |
| 250,618 | 12/1881 | Wilson | 116—110 |
| 643,117 | 2/1900 | Fromberger | 116—70 |
| 869,907 | 11/1907 | Jarvis | 116—110 |
| 1,452,173 | 4/1923 | Scoville | 116—118 |
| 1,938,550 | 12/1933 | Todd | 187—8.75 |
| 1,978,622 | 10/1934 | Clapp | 187—8.52 |
| 1,979,788 | 11/1934 | Bacher | 187—8.52 |
| 2,626,586 | 1/1953 | Mendes | 116—106 |
| 2,719,507 | 10/1955 | Aidlih et al. | 116—67 |
| 3,024,760 | 3/1962 | Enrico | 116—109 |

LOUIS J. CAPOZI, *Primary Examiner.*